Jan. 4, 1938.   F. D. JONES   2,104,199
BALING PRESS
Filed Sept. 19, 1932   5 Sheets-Sheet 1
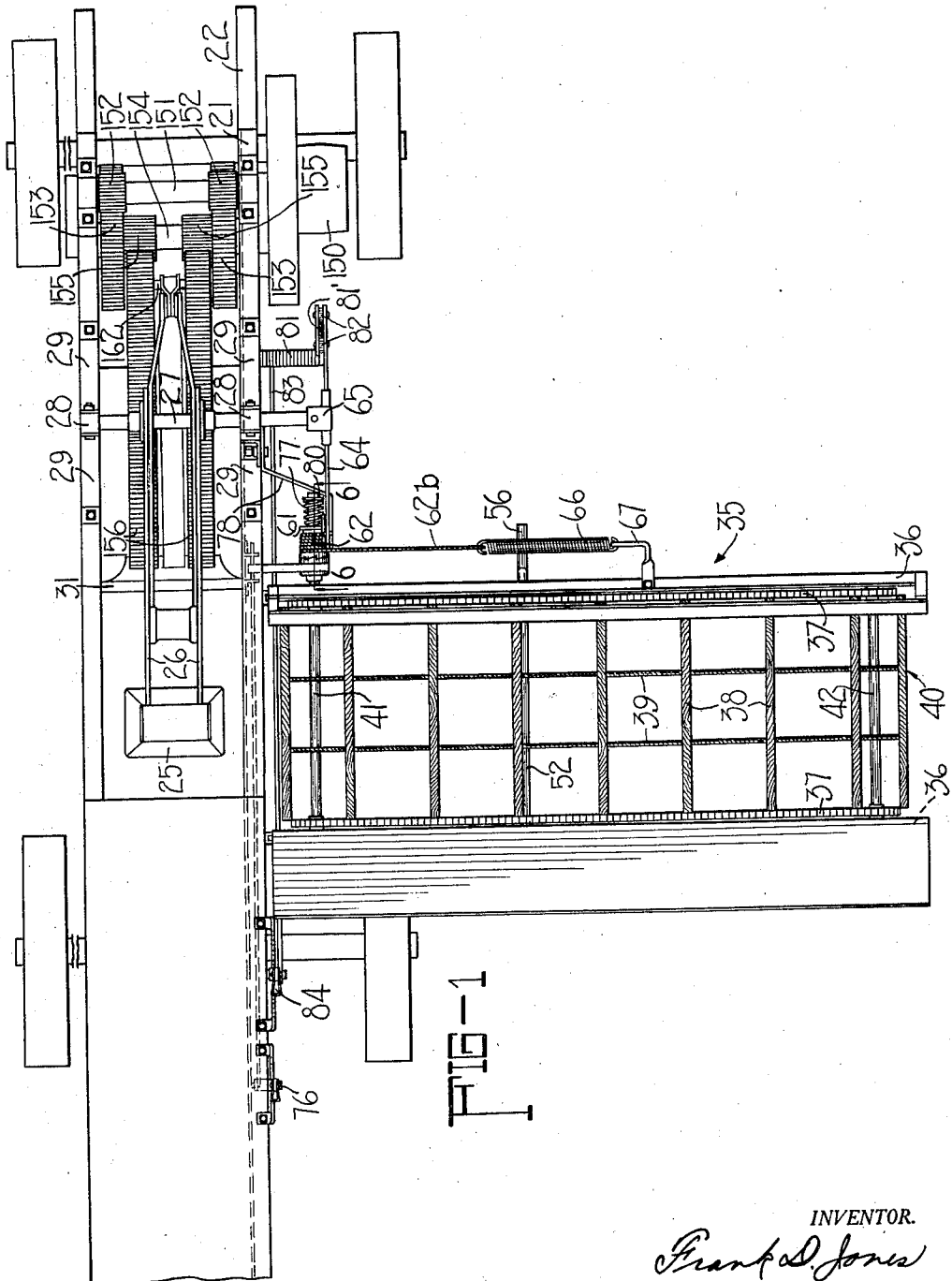
INVENTOR.
Frank D. Jones
BY
ATTORNEY.

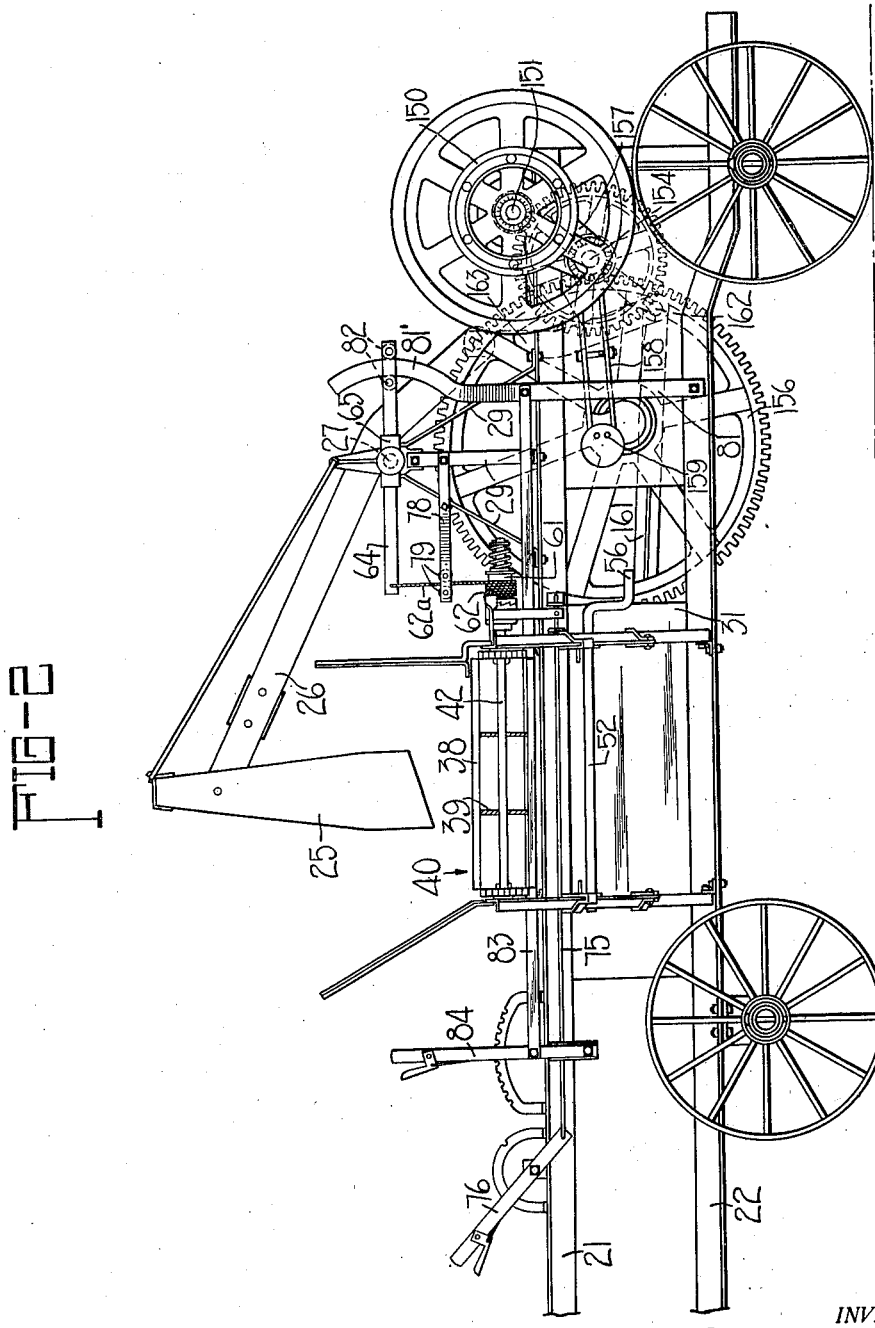

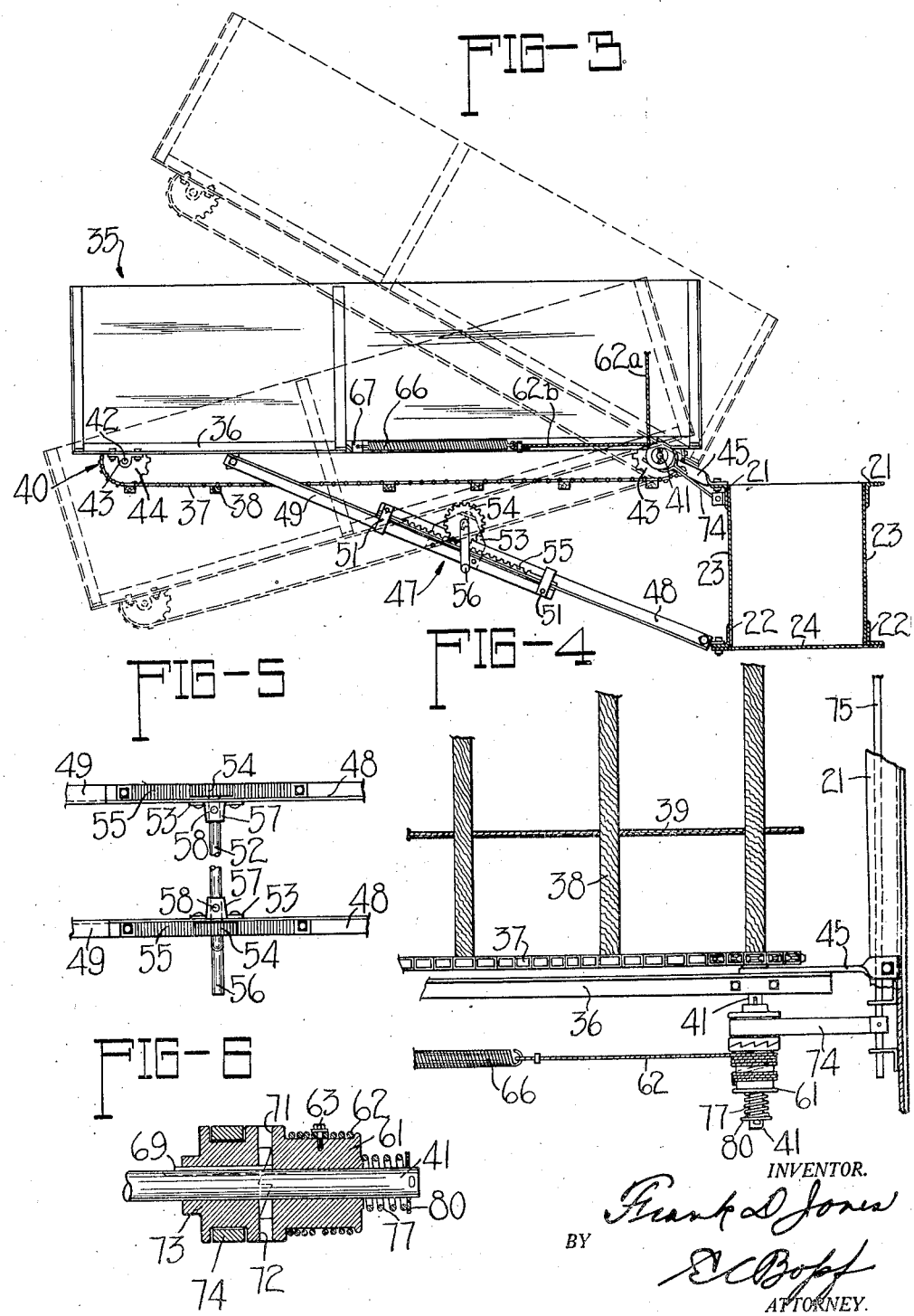

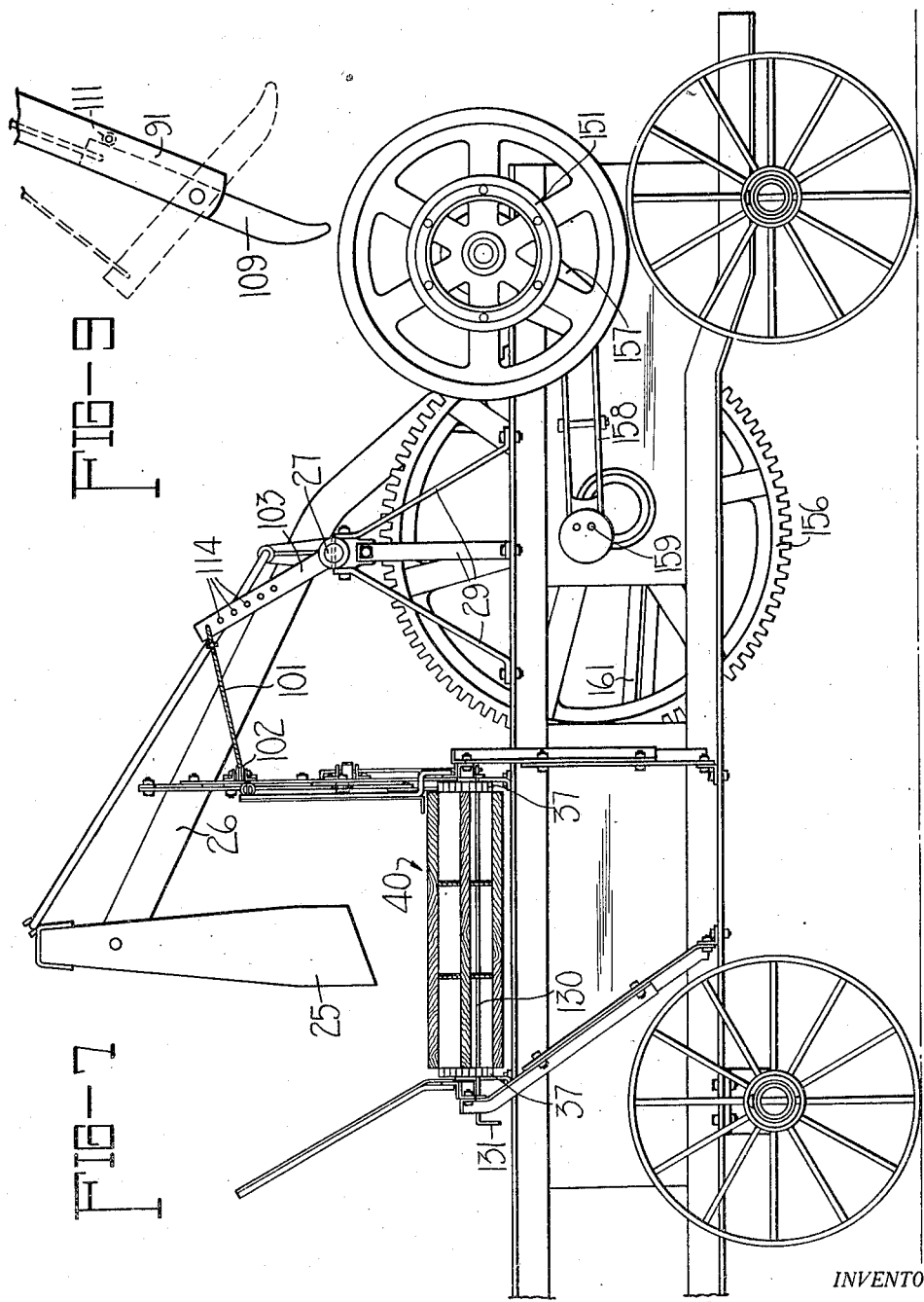

Jan. 4, 1938.  F. D. JONES  2,104,199
BALING PRESS
Filed Sept. 19, 1932   5 Sheets-Sheet 5
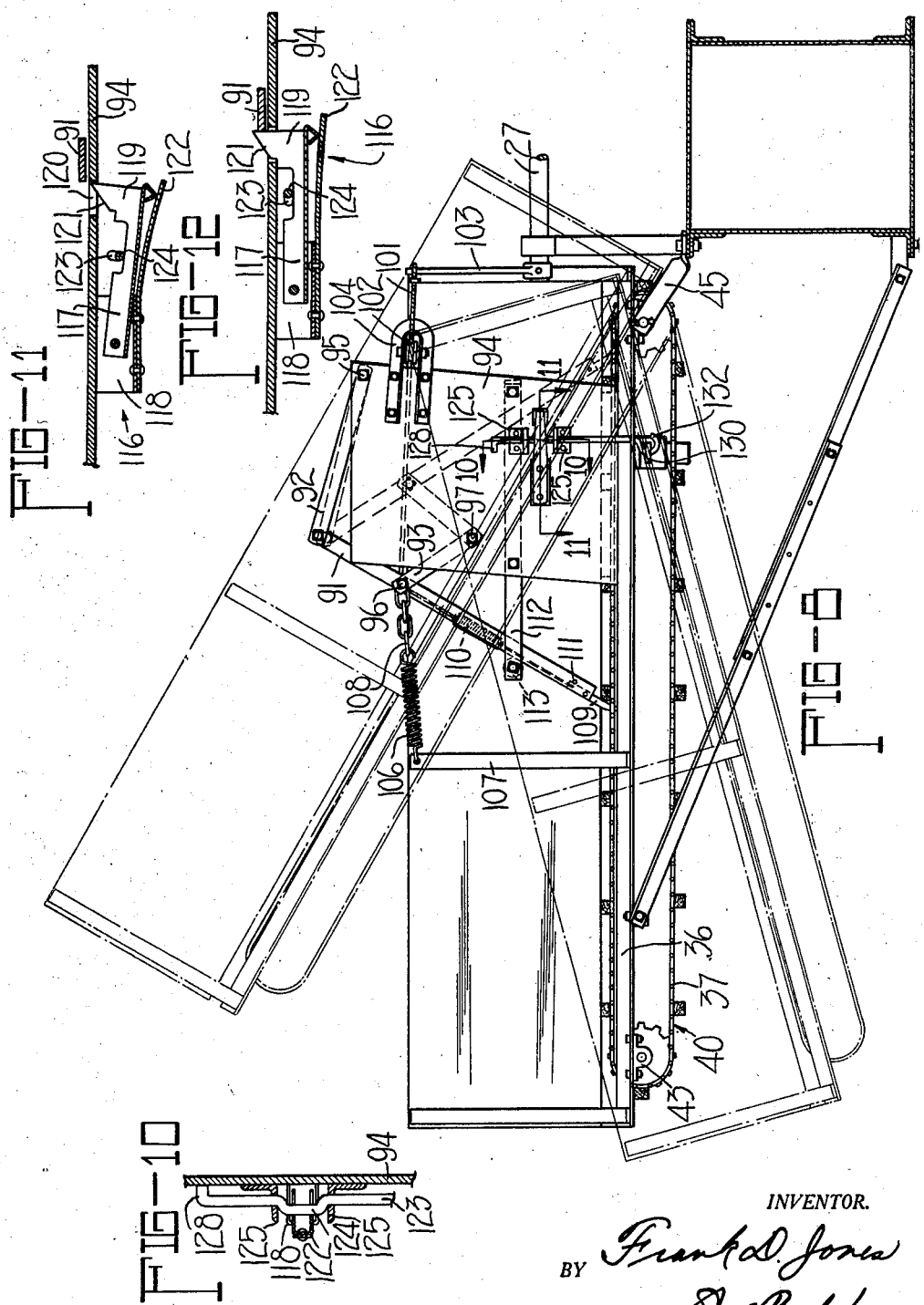
INVENTOR.
BY Frank D. Jones
ATTORNEY.

Patented Jan. 4, 1938

2,104,199

UNITED STATES PATENT OFFICE 2,104,199

BALING PRESS

Frank D. Jones, Ottumwa, Iowa, assignor to Dain Manufacturing Company of Iowa, Ottumwa, Iowa, a corporation of Iowa Application September 19, 1932, Serial No. 633,764

13 Claims. (Cl. 100—25)

My invention relates to self-feeding mechanisms for baling presses, and the main object thereof is to provide an intermittently driven feed conveyor upon which the material to be baled may be placed, and which functions to deliver the material into the baling chamber of the baling press in separate charges.

An important object of my invention is to provide an intermittent drive for the feed conveyor wherein the advance of the conveyor is timed relative to the feeder head of the baling press so that a charge of hay is delivered into the baling chamber each time the feeder head is raised.

Another object of my invention is to provide a control means, positioned within reach of the operator, to regulate the amount of advance of the feed conveyor so as to vary the amount of material delivered in each charge.

Another object of my invention is to provide a means, adapted to be controlled by the operator, by which the feed conveyor may be stopped at will to enable the operator to insert a division block.

A further object of my invention is to provide an improved means for adjustably supporting the outer end of the feed conveyor whereby it may be easily and expeditiously raised or lowered to the desired elevation for loading.

Other objects and advantages of my invention will be apparent to those skilled in the art after a consideration of the following detailed description taken in conjunction with the accompanying drawings wherein:

Figure 1 is a plan view of a conventional baling press with my improved self feeding mechanism attached thereto;

Figure 2 is a side elevational view of the baling press and feeding mechanism;

Figure 3 is an enlarged detail view, partly in section, of the conveyor illustrating the adjustable support and showing in dotted lines the extreme raised and lowered positions of the conveyor;

Figure 4 is an enlarged fragmentary detail view of the conveyor and clutch;

Figure 5 is a detail view of the adjustable supporting bars for the conveyor;

Figure 6 is an enlarged sectional view taken on the plane of line 6—6 of Figure 1;

Figure 7 is a side elevational view of a baling press showing a modified form of driving mechanism;

Figure 8 is an enlarged detail view, partly in section, of the conveyor illustrating the modified form of driving mechanism;

Figure 9 is an enlarged detail view of the lower end of the driving arm used in the modified form of driving mechanism;

Figure 10 is a sectional view taken on the plane of line 10—10 of Figure 8;

Figure 11 is an enlarged sectional view taken on the plane of line 11—11 of Figure 8 and showing the latch dog in a disengaged position to permit the driving arm to operate; and, Figure 12 is a view similar to Figure 11 only showing the latch dog in position to hold the driving arm out of driving engagement with the conveyor.

Referring to Figures 1 to 6 of the drawings, the baling press comprises the usual main frame having upper angle iron bars 21 and lower angle iron bars 22. Sides 23 and a bottom 24 are secured to bars 21 and 22 and serve to enclose the baling chambers in the usual manner.

The material to be baled is fed into the baling chamber by means of a feeder head 25 which is disposed above the baling chamber and is supported on a pair of vertically oscillating arms 26 secured to a transverse rock shaft 27 journaled in bearings 28. The bearings 28 are supported above frame bars 21 by supporting arms 29. A plunger 31 is positioned within the main frame and is movable longitudinally thereof to compress the material into a bale. Upon the forward portion of frame bars 21 is mounted gearing of any suitable arrangement for actuating the plunger and feeder head. In the typical construction shown, 150 is a pulley mounted on a shaft 151. Suitable operating power is connected with pulley 150 by a belt, not shown. A pair of pinions 152 are mounted on shaft 151 and mesh with gears 153 which are mounted on a countershaft 154. A second pair of pinions 155 are mounted on shaft 154 and mesh with eccentric gears 156. The counter-shaft 154 is journaled in swinging brackets 157 depending from shaft 151. The pinions 155 are held in meshing engagement with gears 156 by means of bars 158, the ends of which are journaled on shaft 154 and on pins 159 formed integral with the hubs of gears 156 and concentric with the gears. The plunger indicated at 31 is connected by bar 161 to a wrist pin 162 provided between gears 156. A link 163 connects the arms 26 to the previously mentioned wrist pin 162.

The self feeding mechanism referred to in its entirety by numeral 35 is supported from the baling press adjacent one side of the baling chamber and serves to deliver the hay or other material to be baled to the baling chamber in a manner to be described presently. Mechanism 35 includes a frame having spaced parallel frame bars 36. An endless feed conveyor 40 is supported between bars 36 and comprises a pair of spaced parallel endless chains 37 connected by transverse slats 38 equidistantly spaced along the chain. A pair of endless ropes or cables 39 are secured to the inner side of slats 38 and prevent the hay from falling through between the slats. Transverse shafts 41 and 42 are provided at the inner and outer ends, respectively, of the conveyor frame and are journaled in bearing brackets 43 secured to the bars 36. A pair of sprockets 44 are secured on each of the shafts 41 and 42 over which chains 37 are trained. The inner end of mechanism 35 is supported on the baling press by means of a pair of brackets 45 which are secured to the upper angle iron bar 21. Brackets 45 are provided with perforations adjacent their outer ends to receive shaft 41.

The outer end of mechanism 35 is supported by means of two adjustable supports 47, best shown in Figure 3, extending between and having pivotal connection with bars 36 of the conveyor frame and bar 22 of the baling frame. The supports 47 may be adjusted to raise or lower the outer end of mechanism 35 so that the conveyor may be located in the proper position for loading either from a wagon or from the ground. Each support 47 comprises an inner bar 48 and an outer bar 49 the adjacent ends of which overlap for a portion of their length. They are held in sliding relation by means of a pair of clips 51 which are secured to the ends of bars 48 and 49 and extend around the companion bar. An adjusting shaft 52 is journaled in bearing brackets 53 secured to bars 49. A gear 54 is secured at each end of shaft 52 and meshes with a toothed rack 55 secured on each of the bars 48. The outer end of mechanism 35 may be positioned at any desired elevation by rotating shaft 52. To facilitate rotation of shaft 52 a crank handle 56 is formed on one end thereof.

The mechanism 35 is held in any desired position by means of a lock in the form of a clip 57 formed on each bracket 53. These clips extend inwardly above shaft 52 and are provided with holes to receive a pin 58. Shaft 52 is also provided with holes beneath clips 57 and registering at half revolutions of shaft 52 with the holes in the clips and into which the pins may be projected.

The endless feed conveyor 40 is intermittently driven by means of a driving connection with transverse rock shaft 27. This driving connection comprises a drum 61 journaled on the forwardly extended end of shaft 41. A cable 62 is wound on drum 61 and is secured thereto intermediate its ends by means of a screw 63. The end section 62a of cable 62 extends upwardly and is connected to the rear end of an actuating member in the form of a walking beam 64 which is supported in a bracket 65 secured on an extended end of rock shaft 27. The end 62b of cable 62 is connected to a spring 66 which is anchored to a bracket 67 secured on frame bar 36.

The walking beam 64 is oscillated by the rocking action of rock shaft 27. When the rear end of beam 64 is raised, a portion of cable section 62a is unwound from drum 61 causing the drum to rotate and wind a portion of section 62b of the cable on the drum against the tension of spring 66. When beam 64 is lowered, the tension of spring 66 unwinds section 62b of cable 62 from drum 61 causing the drum to rotate in the opposite direction and wind section 62a of cable 62 on the drum.

Conveyor 40 is advanced when drum 61 is rotated in a clockwise direction, looking at Figure 3, through a ratchet mechanism comprising a ratchet toothed member 71 formed integral with the inner end of drum 61, and a companion toothed member 72 formed integral with a member 73 slidably mounted on a key 69 provided on shaft 41. A shifting fork 74 engages in a groove in member 73 and is connected by a rod 75 with a lever 76 mounted at the operator's station, whereby the operator may shift member 73 out of engagement with member 71. When member 73 is shifted into engagement with member 71, it frequently happens that the teeth are not in position to mesh but contact on their points. To prevent breakage to the teeth a spring 77 is mounted on the extended end of shaft 41 between the end of drum 61 and a washer 80 to permit drum 61 to move outwardly against the tension of spring 77. The inward movement of drum 61 is limited by the drum contacting the end of key 69, as shown in Figure 6.

The amount of hay delivered to the baling chamber in each charge is determined by the extent of movement of the conveyor 40 which depends on the length of cable withdrawn from drum 61 at each stroke of beam 64. Beam 64 is slidable in bracket 65 and may be adjusted inwardly and outwardly thereof to lengthen or shorten the extent of movement of the outer end thereof. When it is desired to feed a large amount of hay into the baling chamber, beam 64 is adjusted outwardly so that the rear end thereof will swing in a relatively long path and draw a relatively large amount of cable 62a off drum 61, advancing conveyor 40 a corresponding distance. When a small charge is desired, beam 64 is shifted inwardly so that the rear end thereof will swing in a relatively short path and draw a small amount of cable 62a off drum 61, thereby moving conveyor 40 a lesser amount. In order that cable 62a will feed on to drum 61 in an even manner in all positions of beam 64, a guide bracket 78 is provided having a pair of rollers 79 mounted on the rear end thereof and spaced apart to receive cable 62a therebetween.

The walking beam 64 may be shifted to any desired position in bracket 65 by the operator from his station beside the baling chamber. For this purpose an adjusting mechanism is provided comprising an adjusting arm 81 which extends upwardly from a pivotal connection with frame bar 22. The upper end 81' of arm 81 is arcuate and is disposed between a pair of rollers 82 mounted on the forward end of beam 64. The arm 81 is rocked about its pivot by means of a shifting bar 83 which extends between arm 81 and a lever 84. Lever 84 is mounted on frame bar 21 adjacent the operator's station. Changing the position of lever 84 rocks arm 81 which in turn shifts beam 64 relative to bracket 65. The distance between rollers 82 is slightly greater than the width of the upper end 81' of arm 81 to prevent binding. The curvature of the upper end 81' of arm 81 is such that the center of curvature thereof is concentric of the axis of shaft 27 when beam 64 is in mid position of adjustment. By giving the upper end 81' this curvature, beam 64 is held substantially stationary with respect to bracket 65 as the bracket and beam are oscillated in all positions of adjusting arm 81.

A modified form of intermittent driving mechanism for the conveyor is shown in Figures 7 to 12 inclusive. This modified construction includes a driving arm 91 supported from the conveyor frame for oscillating movement by a pair of links 92 and 93. These links are connected to a plate 94 secured to the adjacent frame bar 36 of the conveyor frame. Links 92 and 93 are of the proper length and so arranged that the lower end of arm 91 moves in a substantially straight line. The link 92 is pivotally connected to the upper end of arm 91 and extends substantially horizontal to a pivot bolt 95 located adjacent the inner edge of plate 94. The link 93 is mounted on pivot bolt 96 provided on arm 91, below the upper end thereof, and extends inwardly to a connection with pivot bolt 97 provided in plate 94, being substantially vertical when arm 91 is in a mid position of its stroke.

When arm 91 swings inwardly, the lower end thereof engages a link of the adjacent chain 37 and serves to advance conveyor 40. The driving arm 91 is oscillated by means of a driving connection with rock shaft 27. This driving connection comprises a cable 101 connected to bolt 96 on arm 91 and extending inwardly therefrom over a pulley 102 to a connection with an actuating member in the form of an arm 103 secured on shaft 27. The pulley 102 is supported in a U-shaped bracket 104 secured to plate 94 adjacent the inner edge thereof.

The arm 91 is oscillated inwardly in an operating or driving stroke when shaft 27 is rocked clockwise by reason of cable 101 and is swung outwardly in an inoperative stroke, when shaft 27 is rocked counter-clockwise, by means of a spring 106. The spring 106 is anchored to a bar 107 of the conveyor frame and is connected by means of a chain 108 with pivot bolt 96.

A driving dog 109 is pivotally attached, intermediate its ends, to the lower end of arm 91 and is adapted to engage in a link of the adjacent chain 37 of conveyor 40 when arm 91 is oscillated inwardly. The dog 109 is yieldingly held in alignment with arm 91 by means of a spring 110 which extends between the upper end of dog 109 and pivot bolt 96. A stop in the form of a pin 111 is provided on arm 91 to limit the pivotal movement of dog 109 when arm 91 is oscillated in the driving stroke, through the agency of which inward movement is transmitted from the arm to the conveyor. When arm 91 is oscillated in its inoperative stroke the dog 109 pivots away from stop 111, against the tension of spring 110, and rides over the top of the links of chain 37.

The driving arm 91 is held in alignment with chain 37 by means of a guide bar 112 secured on plate 94. A stop 113 is provided on the outer end of bar 112 and serves to limit the outward swinging of arm 91.

The amount of hay delivered in each charge is controlled by the amount of advance of conveyor 40. The amount of advance of conveyor 40 is regulated by connecting cable 101 in the desired one of a series of holes 114 in arm 103.

To enable the operator to stop the conveyor at will, a latch mechanism 116 has been provided by which the driving arm 91 may be locked out of driving engagement with chain 37. The latch mechanism 116 is mounted on plate 94 and comprises a latch member 117 pivotally supported at one end in a bracket 118 secured on the outer face of plate 94. A latch finger 119 is provided on the free end of member 117 and is adapted to extend through a slot 120 in plate 94, under the control of a manually operated shifting rod 123, and engage arm 91 to lock it against swinging. In Figure 12 arm 91 is shown locked against swinging movement. A beveled surface 121 is formed on the end of finger 119 to permit driving arm 91 to swing past finger 119 in driving stroke, the return of the arm thereafter being prevented by the engagement of the arm with the end of the latch member. A leaf spring 122 secured on bracket 118 is provided, which engages member 117, and is tensioned to urge the finger 119 into the slot 120. During operation, member 117 is held in the position shown in Figure 11, with finger 119 withdrawn from the slot by shifting rod 123. Shifting rod 123 is supported in brackets 125 secured to plate 94 at each side of latch member 117, and is provided with an offset portion 124 which is adapted to engage member 117 and rotate it to its unlocked position when rod 123 is rotated. The latch member 117 is held in its unlocked position by a laterally bent extension 128 on the upper end of rod 123 which contacts the side of plate 94 when rod 123 is rotated to a point where offset portion 124 is slightly beyond a dead center position.

The rod 123 is actuated by means of a lever controlled from the operator's station. This lever comprises a bar 130 having a handle 131 formed on its rearward end and supported on frame bars 36. A hole is provided in the forward end of bar 130 to receive an eye 132 formed on the lower end of rod 123.

While I have described, in connection with the accompanying drawings, the specific form in which I prefer to embody my invention, it is to be understood that the invention is not to be limited to the specific means which I have herein shown and described, and that, in fact, widely different means may be employed in the practice of the broader aspects of my invention.

What I claim, therefore, and desire to secure by Letters Patent is:

1. The combination with a baling press comprising a baling chamber, a feed conveyor for delivering material to be baled to the baling chamber, and a vertically reciprocating feeder head mechanism for feeding the material into said baling chamber, of a driving mechanism for said conveyor, a motion transmitting connection between said feeder head mechanism and said driving mechanism for intermittently operating said driving mechanism by power derived from the movement of said feeder head mechanism in one direction, and means whereby said motion transmitting connection may be adjusted to regulate the extent of operation of each movement of said driving mechanism to control the amount of advance of said conveyor whereby the amount of material delivered to said baling chamber at each operation of the conveyor may be varied.

2. The combination with a baling press comprising a main frame, a baling chamber within said frame, a transverse rock shaft supported above the main frame, a vertically reciprocating feeder head mounted upon said rock shaft, and a self feed mechanism having a frame, a drive shaft and an idler shaft supported on said frame, and an endless conveyor supported on said shafts, of an intermittent driving mechanism adapted to advance said conveyor when said feeder head is raised to deliver the material to the baling chamber, said mechanism comprising a walking beam supported on said rock shaft, a drum journaled on said conveyor drive shaft and having a ratchet connection therewith, a cable on said drum, one end of said cable being connected to said walking beam, and a spring connected between the conveyor frame and the other end of said cable whereby when the walking beam is rocked in one direction said drum is rotated in one direction by the withdrawal of one end of said cable from the drum, advancing said conveyor through said ratchet connection, and when the walking beam is rocked in the opposite direction said drum is rotated in the opposite direction by the withdrawal of the other end of said cable from the drum by said spring, said ratchet connection ratcheting permitting said conveyor to remain stationary.

3. The combination with a baling press comprising a main frame, a baling chamber within said frame, a transverse rock shaft supported above the main frame, a vertically reciprocating feeder head mounted upon said rock shaft, and a self feed mechanism having a frame, a drive shaft and an idler shaft supported on said frame, and an endless conveyor supported on said shafts, of an intermittent driving mechanism adapted to advance said conveyor when said feeder head is raised to deliver the material to the baling chamber, said mechanism comprising a walking beam slidably supported on said rock shaft, a spring attached to the conveyor frame, a drum journaled on said conveyor drive shaft, a cable wound on said drum and connected to said walking beam and to said spring, a ratchet clutch between said drum and said drive shaft, means positioned at the operator's station for engaging or disengaging said clutch, and a means positioned at the operator's station to adjust the position of said walking beam relative to said rock shaft.

4. The combination with a baling press comprising a main frame, a baling chamber within said frame, a transverse rock shaft supported above the main frame, a vertically reciprocating feeder head mounted upon said rock shaft, and a self feed mechanism having a frame, a drive shaft and an idler shaft supported on said frame, and an endless conveyor supported on said shafts, of an intermittent driving mechanism adapted to advance said conveyor when said feeder head is raised to deliver the material to the baling chamber, said mechanism comprising a walking beam slidably supported on said rock shaft, a spring attached to the conveyor frame, a drum journaled on said conveyor drive shaft, a ratchet clutch driving connection between said drum and said drive shaft, a cable wound on said drum and connected to one end of said walking beam and to said spring, an arm pivoted on the main frame and having sliding engagement with the opposite end of the walking beam whereby the swinging of said arm adjusts the walking beam relatively to said rock shaft, and means for swinging said arm.

5. The combination with a self feed mechanism having a frame and an endless conveyor supported in said frame, of a driving mechanism adapted to intermittently drive said conveyor, said means comprising a driving arm pivotally mounted on said frame for swinging movement in a vertical plane, a dog pivoted on the free end of said driving arm and adapted to have driving engagement with the conveyor when said arm is swung in one direction, means for swinging said arm in said one direction to advance said conveyor, means for returning said arm to its former position, and operator controlled means for locking said arm against movement.

6. The combination with a baling press comprising a baling chamber, a feeder head and a rocking member supporting the feeder head and by the rocking of which said feeder head is reciprocated to feed material into the baling chamber, of a conveyor, mechanism for intermittently operating said conveyor, and means for actuating said mechanism comprising a walking beam supported on said rocking member, a power transmitting connection between said mechanism and said walking beam whereby said mechanism is actuated by the rocking of said member, and means for shifting said walking beam relative to said rocking member to vary the extent of movement of said power transmitting connection responsive to the rocking of said member to vary the extent of actuation of said mechanism, whereby the extent of movement of said conveyor may be controlled.

7. The combination with a baling press comprising a baling chamber, a feeder head, and a rocking member supporting the feeder head and by the rocking of which said feeder head is reciprocated to feed material into the baling chamber, of a conveyor, mechanism for intermittently operating said conveyor, means for actuating said mechanism comprising a walking beam supported on said rocking member and a power transmitting connection between said mechanism and said walking beam whereby said mechanism is actuated by the rocking of said member, and means for shifting said walking beam relative to said rocking member to vary the extent of movement of said power transmitting connection responsive to the rocking of said member to vary the extent of actuation of said mechanism, whereby the extent of movement of said conveyor may be controlled, said means including an arm pivoted to the press at one end and having an arcuate extension on its free end, a pair of rollers on said walking beam between which said extension is disposed, and means for adjusting the position of said arm, the curvature of said extension being such that the center thereof is substantially coincident with the axis of oscillation of said rocking member when said arm is in a mid position of adjustment, whereby the position of said walking beam relative to said rocking member is not materially changed as said member is rocked with said arm in any position of adjustment.

8. The combination with a baling press comprising a baling chamber, a feeder head and a rocking member supporting the feeder head and by the rocking of which said feeder head is reciprocated to feed material into the baling chamber, of a conveyor, mechanism for intermittently operating said conveyor, and means for actuating said mechanism and comprising a second member connected to said rocking member to be rocked by the latter, a power transmitting connection between said mechanism and said second member, and including a third member connected to the free end of said second member whereby said mechanism is actuated by the rocking of said second member, and means whereby the point of connection of one of said members relative to the member to which it is connected may be adjusted to vary the extent of movement of said power transmitting connection responsive to the rocking of said second member to vary the extent of actuation of said mechanism, whereby the extent of movement of said conveyor may be controlled.

9. The combination with a baling press comprising a main frame, a baling chamber within said frame, an oscillating feeder head arm rockably mounted upon said frame and an endless conveyor supported upon said frame, of an intermittent driving mechanism adapted to advance said conveyor in timed relation with respect to the movements of said oscillating feeder head arm, said mechanism comprising a driving arm pivotally supported on the frame for swinging movement in a vertical plane, a dog pivoted on the free end of said driving arm and adapted to have driving engagement with the conveyor when said driving arm is swung in one direction, a lever arm mounted to oscillate with said feeder head arm, a connection from said lever arm to said driving arm adapted to transmit motion to said driving arm from said lever arm in one direction only, and an additional means for moving said driving arm in the opposite direction.

10. The combination with a self-feed mechanism having a frame and an endless conveyor supported in said frame, of a driving mechanism adapted to intermittently drive said conveyor, said means comprising a driving arm pivotally mounted on said frame for swinging movement in a vertical plane, a dog pivoted on the free end of said driving arm and adapted to have driving engagement with the conveyor when said arm is swung in one direction, means for swinging said arm in said one direction to advance said conveyor, means for returning said arm to its former position, and operator-controlled means for locking said arm against movement at the end of its movement in said one direction.

11. The combination with a baling press comprising a main frame, a baling chamber within said frame, an oscillating feeder head arm on said frame, an endless conveyor supported on said frame, of a driving mechanism adapted to intermittently drive said conveyor comprising a driving arm pivotally supported on said frame for swinging movement in a vertical plane and adapted to have driving engagement with said conveyor when said arm is swung in one direction, means for swinging said arm in one direction to advance said conveyor comprising a lever arm mounted to oscillate with said feeder head oscillating arm and a cable connecting said driving arm and said lever arm, means for returning said arm to its former position, and operator-controlled means for locking said arm against movement at the end of its movement in said one direction, the flexibility of said cable providing for free movement of said feeder head oscillating arm while said driving arm is locked against movement.

12. A self-feeding mechanism for a baling press comprising a frame, a horizontally disposed conveyor supported in said frame, a driving arm, means supporting said arm in a generally vertical position and providing for swinging movement of said arm, comprising a substantially horizontally disposed link pivotally connected at one end to the upper end of said driving arm and pivotally connected at its other end to said frame and a second generally vertically disposed link pivotally connected at its upper end to said driving arm at a point below the upper end thereof and connected at its lower end to said frame, said links being arranged to cause the lower end of said arm to move in a substantially straight line and maintain driving contact with the conveyor during its swinging movement in one direction, and means for swinging said driving arm to actuate said conveyor.

13. The combination with a baling press comprising a main frame, a baling chamber within said frame and an oscillating feeder head arm on said frame, of an endless conveyor disposed to deliver material into said baling chamber and adjustably mounted to swing about an axis adjacent said baling chamber whereby the vertical position of the outer end of said conveyor may be adjusted, driving mechanism for intermittently driving said conveyor, a lever arm mounted to oscillate with said feeder head arm, a pulley on the conveyor, and a cable extending from said lever arm over said pulley to said driving mechanism whereby said driving mechanism is actuated by the oscillation of said feeder arm, said pulley and lever arm being disposed in a line substantially parallel to the axis about which said conveyor is adjustable whereby the operation of said driving mechanism is not materially affected by changes in the position of said conveyor.

FRANK D. JONES.